United States Patent [19]

Jones

[11] Patent Number: 4,809,542

[45] Date of Patent: Mar. 7, 1989

[54] LEAK TESTING DEVICE FOR PRESSURE VESSELS

[76] Inventor: Jerry L. Jones, 565 Crapanzano Rd., Hammond, La. 70401

[21] Appl. No.: 141,557

[22] Filed: Jan. 7, 1988

[51] Int. Cl.⁴ .............................................. G01M 3/33
[52] U.S. Cl. ..................................... 73/45.8; 73/49.7; 73/49.8
[58] Field of Search .................... 73/37, 40, 45.5, 45.8, 73/49.2, 49.7, 49.8; 220/315, 323, 324, D32; 138/90, 89; 292/D49

[56] References Cited

U.S. PATENT DOCUMENTS

| | | | |
|---|---|---|---|
| 2,847,851 | 8/1958 | Enell | 73/45.8 |
| 3,014,361 | 12/1961 | Black | 73/40 |
| 3,035,436 | 5/1962 | Johnson | 73/40 |
| 3,680,361 | 8/1972 | Taylor | 73/45.8 |
| 4,351,446 | 9/1982 | Madden | 220/323 |
| 4,467,936 | 8/1984 | Makhijani | 220/32.3 |

FOREIGN PATENT DOCUMENTS 757093  12/1933  France ................................ 138/90

*Primary Examiner*—Stewart J. Levy
*Assistant Examiner*—Hezron E. Williams

[57] ABSTRACT

A removable leak testing device for pressure vessels is disclosed. The leak testing device has a base member which overlies the open top of the inlet of the pressure vessel and has a pair of pivotally mounted latches which are mounted on opposite sides of the base member. Each of the latches has at least one finger engagement member which is designed to engage the underside of an out-turned peripheral rim of the inlet of the pressure vessel. A hollow stem is slideably disposed within a central aperture of the base member where the hollow stem has a resilient seal member on one of its ends for engaging an interior seat within the inlet of the pressure vessel. A compression spring is placed between the base member and the resilient seal and surrounds the stem while a nut is bottomed on the base member which enables compression of the spring by rotation of the latches causing the fingers to pull the base member toward the neck to compress the spring and load the seal on the seat of the inlet opening.

3 Claims, 2 Drawing Sheets

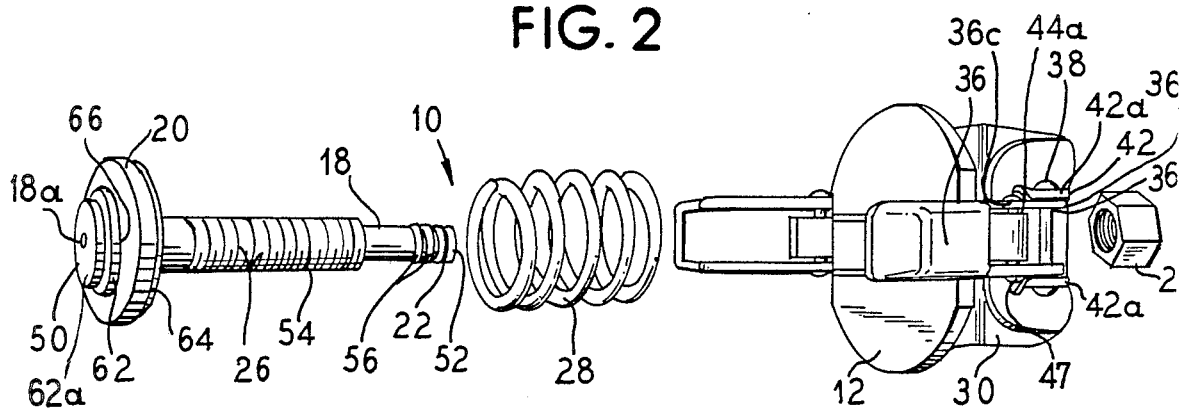
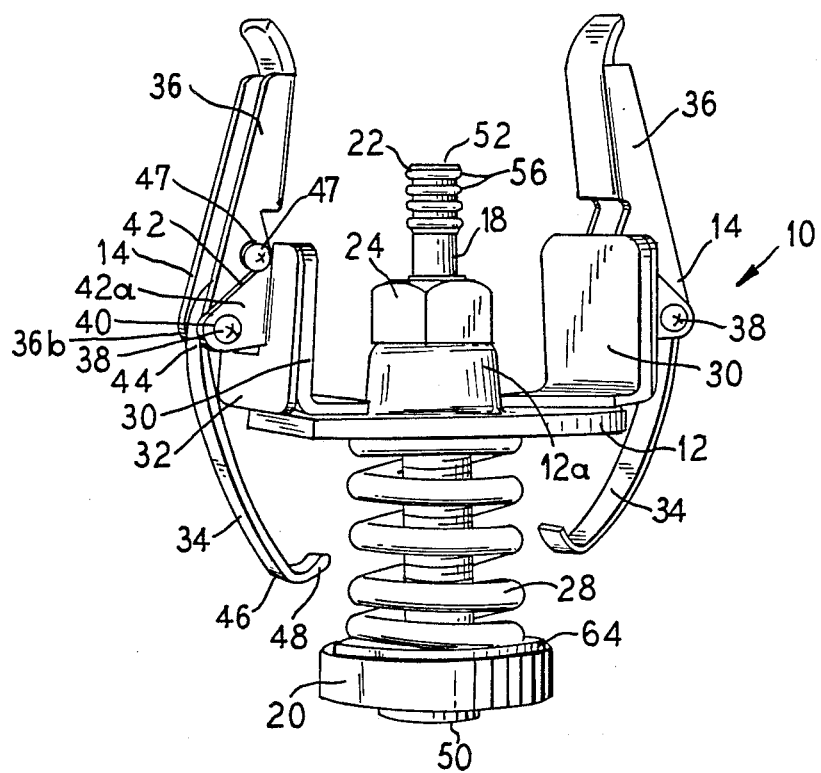

LEAK TESTING DEVICE FOR PRESSURE VESSELS

BACKGROUND OF THE INVENTION

1. Field of the Invention

This invention relates to the art of testing pressure vessels for leaks and specifically deals with a leak testing device which easily engages and seals off an inlet of a pressure vessel having an out-turned peripheral rim and an interior seat where air may be injected through the leak testing device to determine the presence of any leaks in the pressure vessel itself. Such devices are used, for example, in the testing of automobile radiators where the inlet has a neck with an out-turned peripheral rim and an interior seat which is sealed off by the device. Air is injected into the radiator through the leak testing device and the radiator is then submersed into a liquid, such as water. If any leaks exist in the walls of the radiator, air will escape from any such leaks and will be visible to an observer as bubbles rising in the water.

2. Prior Art

Existing leak testing devices are generally comprised of a resilient stopper which engages an inner seat of the inlet of a pressure vessel, such as a radiator, to seal off the inlet where the device has a central aperture which permits air to be forced therethrough into the vessel. These devices are normally affixed to the radiator by a cap which is threaded onto the outer threads of the neck of the inlet whereby the stopper is forced into engagement with the interior seat of the inlet by a spring compression mechanism as the cap is threaded onto the inlet neck. Such devices normally require a significant downward force on the cap to compress the spring before the threads can be engaged as well as a downward force to remove the cap.

Other devices are comprised of a resilient stopper which seals off the vessel inlet by expanding within the throat of the vessel. Expansion of the resilient stopper is usually provided by a nut which is threaded on one end of a central stem which in turn extends through the stopper. When tightened, the nut moves toward a base plate on the opposite end of the stopper thereby compressing and expanding the stopper outwardly therebetween. In either case, these existing stoppers are difficult to engage, do not provide sufficient adjustability and do no adequately seal off the inlet of the vessel.

SUMMARY OF THE INVENTION

According to this invention there is provided a leak testing device having a base member which overlies the inlet neck opening of a vessel. The base member has a central aperture and a pair of latches pivotally mounted on opposite sides of the base member which have finger portions for engagement with the underside of an out-turned peripheral rim on the neck of the vessel. A hollow stem is disposed within the central aperture of the base member and has a resilient seal on one end for engaging the interior seat of the neck. The hollow stem also has a means for attaching a compressed air conduit on its other end and a threaded section intermediate its ends. A compression spring surrounds the stem and is positioned between the base member and the resilient seal while a nut is threadingly engaged on the stem, bottomed on the base member to hold the assembly together.

To seal the inlet neck opening, the resilient seal is placed within the inlet of the vessel while the fingers of the latches engage the out-turned peripheral rim of the inlet. Upon pivoting the latches, the fingers pull the base member toward the inlet to compress the spring and force the seal against the seat of the inlet.

BRIEF DESCRIPTION OF THE DRAWINGS

FIG. 1 is a perspective view of the leak testing device of the present invention;

FIG. 2 is an exploded view of the device shown in FIG. 1;

DESCRIPTION OF THE EXEMPLARY EMBODIMENT

Figure 3:
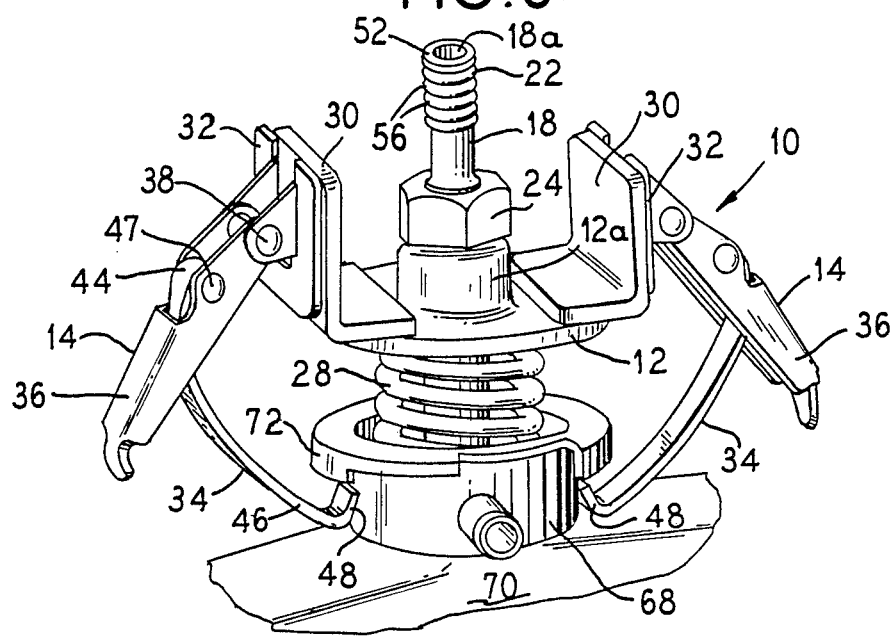
FIG. 3 is a perspective view of the device shown within an automobile radiator inlet prior to engagement.

The principles of the present invention are incorporated in a leak testing device generally indicated in the drawings by reference numeral 10.

As FIGS. 1 and 2 illustrate, the leak testing device 10 has a circular base member 12 having a radial shoulder 12a, a pair of latches 14 mounted on opposite sides of the base member 12 and a central aperture 16. A hollow stem 18 having a central aperture 18a extends through the aperture 16 and has a resilient seal 20 on one of its ends as well as an attachment 22 for a compressed air conduit on its other end. A nut 24 is engaged on the hollow stem 18 by threads 26, bottomed on the shoulder 12a of the base member 12. A spring 28 is placed between the base member 12 and the resilient seal 20 and surrounds the stem 18.

The circular base member 12 is basically in the shape of a flat disk having the shoulder 12a and the aperture 16, which may be formed, for example, from sheet metal or any other desired material. On either side of the base member 12 extends an upstanding ear 30, which is generally L-shaped. Each ear 30 may be integrally formed with the base member 12 or may be attached to the base member 12 in a variety of ways without departing from the teachings of the present invention. In this exemplary embodiment, the ears 30 are welded onto the base member 12.

Each latch 14 has a supporting flange 32, an engagement finger 34 and a latch arm 36. The latch 14 is affixed to the ear 30 through the supporting flange 32 such as, for example, by welding. The latch arm 36 is pivotally mounted to the supporting flange 32 by a first pivot or hinge 38 which extends through apertures 36a in the proximal end 36b of the latch arm 36 and through apertures 40 in a bracket 42 which is integral with the supporting flange 32 and has two upstanding engagement arms 42a. The bracket 42 may be struck from the supporting flange 32 or may be affixed in any desired manner while the pivot 38 may be in the form of a screw, rivet or similar article.

Figure 4:
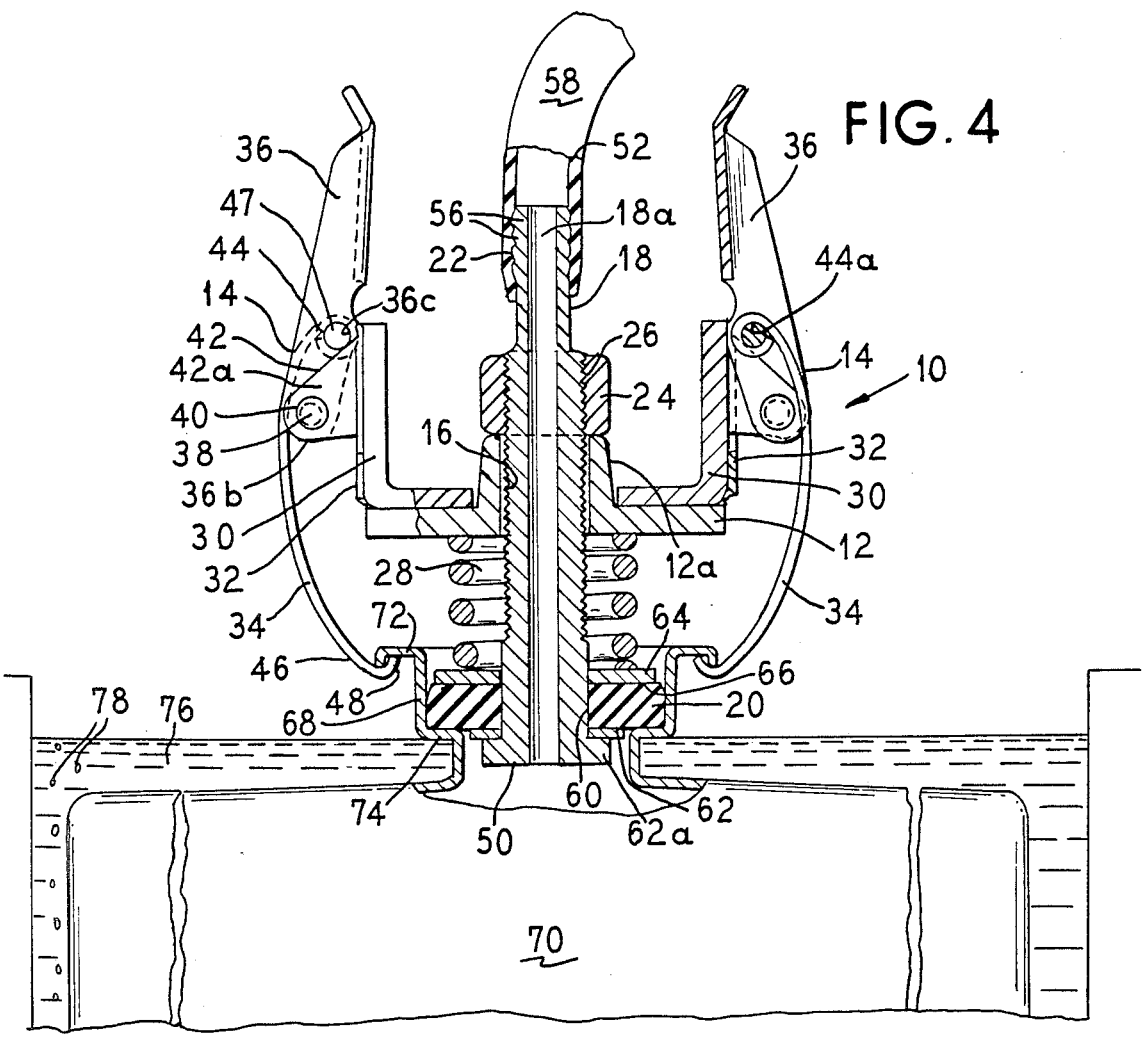
FIG. 4 is a partial cross-sectional view illustrating the device fully engaged within an automobile radiator inlet with the radiator submersed in a testing tank.

Each engagement finger 34 has a proximal end 44 and a distal end 46. The proximal end 44 of each engagement finger 34 is pivotally mounted to each latch arm 36 by a second pivot or hinge 47. The second pivot 47 extends through apertures 36c in each latch arm 36 and extends through an aperture 44a in the proximal end 44 of each engagement finger 34. Alternatively, the aperture 44a may be formed in a variety of ways, such as, by wrapping the proximal end 44 of the engagement finger 34 into a circular shape as shown in FIG. 4.

The distal end 46 of the engagement finger 34 also has a slightly bent portion 48 which combines with the action of latch arms 36 to provide the desired engagement as will be described in further detail hereinafter.

As shown in FIG. 2, the hollow stem 18 has a central aperture 18a as well as a distal end 50, a proximal end 52 and a plurality of threads 26 extending over a threaded portion 54 intermediate the distal and proximal ends 50 and 52. Formed on the proximal end 52 of the stem 18 are a plurality of circumferential ridges 56 which make up the attachment 22 which are designed to accommodate and secure a compressed air line or conduit 58 to the stem 18 as illustrated in FIG. 4. Although the aperture 18a of the stem 18 is shown in FIG. 2 as being reduced in diameter near its distal end 50, it is to be understood that the diameter of the aperture 18a may vary and, as FIG. 4 shows, may be of a uniform diameter throughout the length of the stem 18.

The resilient seal 20 is affixed to the distal end 50 of the stem 18, and, in this exemplary embodiment, is made of rubber and is in the form of a circular disk having a central aperture 60 which accommodates the stem 18. The resilient seal 20 is bottomed on a first radially extending circular flange 62 which may be integrally formed to the distal end 50 of the stem 18, or may be bottomed on a radially extending integrally formed shoulder 62a, and prevents removal of the resilient seal 20 from the stem 18. The top side of the resilient seal 20 is backed up by a second radially extending circular flange 64 which may also be integrally formed on the stem 18 proximate the distal end 50 and the first circular flange 62. Thus, the resilient seal 20 is disposed in a channel 66 formed between the first and second flanges 62 and 64 to prohibit movement of the resilient seal 20 in an axial direction with respect to the stem 18.

It is to be noted that in this exemplary embodiment the first circular flange 62 has a diameter somewhat smaller than that of the resilient seal 20 which enables the resilient seal 20 to contact and seal off a seat within a radiator neck as shown in FIG. 4 and will be described later. Moreover, the second circular flange 64 has a diameter which is somewhat greater than the diameter of the first circular flange 62 yet is somewhat smaller than the diameter of the resilient seal 20 to provide a back-up for the resilient seal 20 and, therefore, a more effective seal. Alternatively, the dimensions of first and second circular flanges 62 and 64 as well as the dimensions of the resilient seal 20, may be modified without departing from the teachings of the present invention. Additionally, first and second circular flanges 62 and 64 may be in the form of circular washers. In this case, the second flange 64 may still be affixed to the stem 18, such as by welding. The first flange 62 would then be held on the stem 18 by a nut (not shown) which engages a threaded portion (not shown) on the distal end 50 of the stem 18 or may be held on by the radially extending shoulder 62a.

The spring 28 is disposed between the base member 12 and the second circular flange 64 and surrounds the stem 18. Also, the nut 24 is bottomed on the shoulder 12a of the base member 12 and is threaded on threads 26 to restrict movement of the base 12 toward the proximal end 52 of the stem 18. The spring 28 thereby provides a force between the base member 12 and the second circular flange 64 which, during clamping of the device 10, enables a compression fit for the resilient seal 20 as will be described in detail hereinafter.

To assemble the leak testing device 10, the spring 28 is placed around the stem 18 which already has first and second circular flanges 62 and 64 as well as the resilient seal 20 attached to its distal end 50. Next, the base member 12, with latches 14 attached, is placed on the stem 18 and is bottomed on the spring 28. Finally, the nut 24 is threaded on the stem 18 to complete the structure.

In operation, the resilient seal 20 of the distal end 50 of the stem 18 is placed within an inlet neck 68 of an automobile radiator 70. The inlet neck 68 has an out-turned peripheral rim 72 and an interior seat 74 which the resilient seal 20 is abutted against. The latches 14 at this time are in their downward position, as shown in FIG. 3, and the bent portions 48 on the distal ends 46 of the engagement fingers 34 engage the underside of the peripheral rim 72 of the inlet neck 68. Next, the latch arms 36 of latches 14 are rotated upward, to the position shown in FIG. 4. This causes the base member 12 to move downward on the stem 18 and exert a downward force on the spring 27 which in turn simultaneously forces the resilient seal 20 and the stem 18 downward so that the resilient seal 20 may properly engage the interior seat 74 of the inlet neck 68 and provide an effective seal. Thereafter, a compressed air conduit 58 may be affixed to the ridges 56 which make up the attachment 22 on the proximal end 52 of the hollow stem 18 and air may be injected through the hollow stem 18 into the automobile radiator 70. Next, the radiator is submersed in a liquid 76, such as water, whereby the compressed air will escape through any leaks in the radiator which can be recognized and located by an operator by air bubbles 78 rising in the water.

Due to the adjustability of the nut 24 on the threaded portion 54 of the stem 18, the compression of the seal 20 may be altered. Therefore, the device 10 may be readily adjusted by an operator to accommodate different dimensions of an inlet neck 68 without having to add or substitute parts. Moreover, the simple rotation of the latches 14 may be quickly and easily performed without any tools.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim:

1. A removable leak test device for radiators and the like having an open top neck with an out-turned peripheral rim and an interior seat which comprises:

a base plate adapted to overlap the open top of the neck having diametrically opposite up-turned ears and a central aperture therethrough;

toggle latches having handles pivoted on said ears and fingers pivoted on the handles for engaging the under face of the rim;

a hollow stem slideable through said central aperture of said base plate, said stem having a threaded section;

a resilient seal on the end of said stem for engaging the seat;

a compression spring around said stem between said base plate and said seal;

a nut threaded on said stem bottomed on said base plate to adjust the compression of said spring; and means on said stem for attaching a pressure conduit to pressurize the vessel, whereby when said handles are pulled upwardly on said ears, said fingers will pull said base plate toward the rim of the neck to compress said spring and load said seal against the seat.

2. A readily attachable and detachable leak test device for sealing off an inlet neck of an automobile radiator where the neck has a circumferential outer engagement flange and an interior circumferential seat and which can be used for testing a radiator for leaks by injecting air through said device into the interior of the radiator which is then immersed in water to detect any leaks comprising:

an elongated tubular stem having distal and proximal ends, said stem being threaded on its exterior surface along its length intermediate said distal and proximal ends;

a circular resilient seal affixed to the distal end of said stem having a diameter greater than the diameter of said stem and corresponding to the diameter of the interior seat for engaging the seat, said seal being backed by a radial flange on said stem to prevent axial displacement of the seal;

a circular base plate overlapping the open top of the neck having a central aperture for slidingly accepting said stem therethrough, said base plate being placed between said distal and proximal ends of said stem and having at least two pivotable latches affixed on opposite sides of said base plate, each of said latches having a latch hook on one of its ends for engaging the under face of the flange;

a spring surrounding said stem and positioned between said base plate and said seal; and a nut bottomed on said base plate, said nut being threaded on said stem;

whereby the seal is inserted within the inlet opening of the automobile radiator to abut against said seat, said latch hooks engage the outer engagement flange of the inlet opening, said latches are upwardly rotated to provide positive engagement between said rubber seal and said inlet by drawing said base plate toward the neck to compress said spring and load said seal against the seat and air may be injected through the stem from its proximal end into the interior of the radiator to determine the presence of any leaks within the radiator.

3. A method of testing pressure vessels for leaks where the pressure vessel has a neck with an open top, an out-turned peripheral rim and an interior seat which comprises:

providing a device for sealing the neck of the pressure vessel, said device having a base member with a central aperture for overlying the open top of the neck, a pair of latches pivotally mounted on said base member having fingers for engaging the underside of the rim of the neck, a hollow stem slideable through the central aperture of the base, said stem having a distal and proximal end, said distal end of said stem having a resilient seal for engagement with said interior seat of said neck, said proximal end having a means for attaching a pressure conduit, said stem having a threaded portion intermediate said distal and proximal ends, a spring surrounding said stem between said base member and said seal and a nut threaded on said stem bottomed on said base member;

rotating said latches to a first open position;

placing said resilient seal of said distal end of said stem within said neck of said pressure vessel abutting against said interior seat;

engaging said fingers of said latches with the underside of the out-turned peripheral rims;

rotating said latches to a second closed position so that said base member moves toward said neck and exerts a compressive force on said spring which in turn forces said resilient seal against said interior seat;

affixing a compressed air conduit to said proximal end of stem;

injecting compressed air into said vessel through said stem; and submersing said pressure vessel in water whereby a leak in said pressure vessel may be detected by air escaping through said leak and rising through said water as bubbles which may be observed by an operator.

* * * * *